United States Patent
Yang et al.

(10) Patent No.: US 10,256,737 B2
(45) Date of Patent: Apr. 9, 2019

(54) INTEGRATED MAGNETIC APPARATUS AND DC-DC CONVERTER INCLUDING THE SAME

(71) Applicant: Hyundai Motor Company, Seoul (KR)

(72) Inventors: Si Hun Yang, Hwaseong-si (KR); Woo Young Lee, Yongin-si (KR); Young Jin Kim, Incheon (KR); Jin Young Yang, Hanam-si (KR); Jin Myeong Yang, Busan (KR); Gyu Yeong Choe, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/356,097

(22) Filed: Nov. 18, 2016

(65) Prior Publication Data
US 2018/0041133 A1    Feb. 8, 2018

(30) Foreign Application Priority Data
Aug. 8, 2016 (KR) .................. 10-2016-0100770

(51) Int. Cl.
| | |
|---|---|
| *H01F 27/08* | (2006.01) |
| *H01F 27/10* | (2006.01) |
| *H01F 27/24* | (2006.01) |
| *H01F 27/28* | (2006.01) |
| *H01F 30/12* | (2006.01) |
| *H02M 3/335* | (2006.01) |
| *H01F 27/02* | (2006.01) |
| *H02J 7/00* | (2006.01) |
| *H02M 1/40* | (2007.01) |
| *H02M 3/337* | (2006.01) |
| *H02M 1/00* | (2006.01) |

(52) U.S. Cl.
CPC ...... *H02M 3/33569* (2013.01); *H01F 27/025* (2013.01); *H02J 7/0052* (2013.01); *H02M 1/40* (2013.01); *H02M 3/337* (2013.01); *H02J 2007/0059* (2013.01); *H02M 2001/007* (2013.01)

(58) Field of Classification Search
CPC . H01F 3/00; H01F 3/14; H01F 27/025; H01F 27/06; H01F 27/08; H01F 27/24; H01F 27/28; H01F 27/2876
USPC .......... 336/212, 61, 170, 65, 184, 178, 5, 58
See application file for complete search history.

(56) References Cited

U.S. PATENT DOCUMENTS

| | | | | |
|---|---|---|---|---|
| 4,419,648 A | * | 12/1983 | Seipel | ............... H01F 21/08 323/250 |
| 6,362,714 B1 | * | 3/2002 | Rice | ............... H01F 17/0033 336/179 |

(Continued)

FOREIGN PATENT DOCUMENTS

| | | |
|---|---|---|
| JP | H01-114368 A | 5/1989 |
| JP | 4878562 B2 | 2/2012 |

(Continued)

*Primary Examiner* — Mang Tin Bik Lian
(74) *Attorney, Agent, or Firm* — Morgan, Lewis & Bockius LLP

(57) ABSTRACT

A single direct current (DC)-DC converter may include a switching part switching an input DC voltage; first and second transforming parts transforming an output of the switching part; a rectifying part rectifying outputs of each of the first and second transforming parts; and an output part filtering and outputting an output of the rectifying part.

4 Claims, 12 Drawing Sheets

(56) References Cited

U.S. PATENT DOCUMENTS

| | | | |
|---|---|---|---|
| 7,289,329 B2 | 10/2007 | Chen et al. | |
| 2012/0146753 A1* | 6/2012 | Lukso | H01F 27/027 336/5 |
| 2013/0201728 A1* | 8/2013 | Njiende | H02M 3/335 363/21.04 |
| 2013/0314185 A1 | 11/2013 | Eom et al. | |
| 2014/0118099 A1* | 5/2014 | Smajic | H01F 27/025 336/5 |

FOREIGN PATENT DOCUMENTS

| | | |
|---|---|---|
| JP | 2013-030325 A | 2/2013 |
| JP | 2013-188014 A | 9/2013 |
| JP | 2016-102626 A | 6/2016 |
| KR | 10-2009-0071997 A | 7/2009 |
| KR | 10-2009-0102288 A | 9/2009 |
| KR | 10-1229265 B1 | 2/2013 |
| KR | 10-2013-0130467 A | 12/2013 |
| KR | 10-2014-0033708 A | 3/2014 |
| KR | 10-2015-0111425 A | 10/2015 |

* cited by examiner

INTEGRATED MAGNETIC APPARATUS AND DC-DC CONVERTER INCLUDING THE SAME

CROSS-REFERENCE TO RELATED APPLICATION

The present application is based on and claims the benefit of priority to Korean Patent Application No. 10-2016-0100770, filed on Aug. 8, 2016, the entire contents of which is incorporated herein for all purposes by this reference.

FIELD OF THE INVENTION

The present invention relates to an integrated magnetic apparatus and a direct current (DC)-DC converter including the same, and more particularly, to a single DC-DC converter for a charger, and an integrated magnetic apparatus thereof.

BACKGROUND

As advanced countries actively recently push reinforcement of fuel consumption regulations and development and spread of an environmentally friendly vehicle, demand for a plug-in hybrid electric vehicle/an electric vehicle (PHEV/EV) has been rapidly increased. However, due to inconvenience caused by a long charging time and a short driving distance and a high cost, trust of consumers for the environmentally friendly vehicle is not high till now. Therefore, technology of increasing a driving distance of the environmentally friendly vehicle by mounting a large capacity battery in the environmentally friendly vehicle has been developed.

However, a capacity of a battery charger also needs to be increased in order to shorten a charging time increased due to an increase in a battery capacity, and when the capacity of the battery charger is increased, a size and a cost of the battery charger are also increased in proportion to the capacity.

Since the environmentally friendly vehicle has a problem such as a narrow internal space and a cost higher than that of a general internal combustion engine vehicle, it has become important to decrease the size and the cost of the battery charger while increasing the capacity of the battery charger.

In the case of a conventional 11 kW-level low speed charger, due to a large capacity, converters of a power factor corrector (PFC) stage and a direct current (DC)-DC stage are generally configured in two to three parallel structures. As the number of converters is increased, the number of microcomputers for controlling the converters is increased, and a circuit becomes complicated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a direct current (DC)-DC converter of which a cost and a size may be minimized by using a single microcomputer.

An aspect of the present invention also provides an integrated magnetic apparatus in which a transformer and an inductor are combined with each other.

An aspect of the present invention also provides an integrated magnetic apparatus configured for solving a heat generation problem by including a cooling bar.

Objects of the present invention are not limited to the above-mentioned objects. That is, other objects that are not mentioned may be obviously understood by those skilled in the art from the following description.

According to an exemplary embodiment of the present invention, a single DC-DC converter includes: a switching part switching an input DC voltage; first and second transforming parts transforming an output of the switching part; a rectifying part rectifying outputs of each of the first and second transforming parts; and an output part filtering and outputting an output of the rectifying part.

The output part may include: an inductor connected to an output stage of the rectifying part; and a capacitor connected to an output stage of the inductor.

The first and second transforming parts and the inductor may be combined with one another to thereby be configured in an integrated magnetic structure.

The integrated magnetic structure may include: a bottom surface having a predetermined size; at least one pillar disposed on the bottom surface to be spaced apart from each other by predetermined intervals and having coils wound therearound, respectively; and a roof surface provided on the pillars and facing the bottom surface in parallel with the bottom surface.

The at least one pillar may include: a first pillar driven as the first transforming part; a second pillar driven as the second transforming part; and a third pillar driven as the inductor.

The integrated magnetic structure may further include: a housing part provided beneath the bottom surface and including a coolant disposed therebeneath; and a cooling bar provided on a central portion of the housing part, passing through a central portion of the bottom surface, and provided in parallel with at least one pillar.

According to another exemplary embodiment of the present invention, an integrated magnetic apparatus includes: a bottom surface having a predetermined size; at least one pillar disposed on the bottom surface to be spaced apart from each other by predetermined intervals and having coils wound therearound, respectively, to thereby be driven as at least one transforming part or at least one inductor; and a roof surface provided on the at least one pillar and facing the bottom surface in parallel with the bottom surface.

The at least one pillar may include: a first pillar driven as a first transforming part of the at least one transforming parts; a second pillar driven as a second transforming part of the at least one transforming part; and a third pillar driven as one of the at least one inductor.

The integrated magnetic apparatus may further include: a housing part provided beneath the bottom surface and including a coolant disposed therebeneath; and a cooling bar surrounded by the at least one pillar in a state in which the cooling bar is spaced apart from the at least one pillar by predetermined intervals, provided on a central portion of the housing part, passing through a central portion of the bottom surface, and provided in parallel with the at least one pillar.

The third pillar may be separated into a part adjacent to the bottom surface and a part adjacent to the roof surface to thereby include a gap disposed between the part adjacent to the bottom surface and the part adjacent to the roof surface.

The at least one pillar may include: first and second pillars driven as one of the at least one transforming part; a third pillar driven as a first inductor of the at least one inductor; and a fourth pillar driven as a second inductor of the at least one inductor. The integrated magnetic apparatus may further include: a housing part provided beneath the bottom surface and including a coolant disposed therebeneath; and a cooling bar surrounded by the at least one pillar in a state in which the cooling bar is spaced apart from the at least one pillar by predetermined intervals, provided on a central portion of the housing part, passing through a central portion of the bottom surface, and provided in parallel with the at least one pillar.

According to still another exemplary embodiment of the present invention, a DC-DC converter includes: an input part through which input DC power is input; a switching part switching the input DC power input through the input part; a transforming part transforming an output of the switching part; a rectifying part rectifying an output of the transforming part; and an output part filtering an output of the rectifying part, wherein the input part includes a first inductor, the output part includes a second inductor, and the DC-DC converter includes an integrated magnetic structure in which the transforming part, the first inductor, and the second inductor are integrated with each other.

The integrated magnetic structure may include: a bottom surface having a predetermined size; at least one pillar disposed on the bottom surface to be spaced apart from each other by predetermined intervals and having coils wound therearound, respectively, to thereby be driven as the transforming part, the first inductor, and the second inductor; and a roof surface provided on the at least one pillar and facing the bottom surface in parallel with the bottom surface.

The at least one pillar may include: first and second pillars driven as the transforming part; a third pillar driven as the first inductor; and a fourth pillar driven as the second inductor.

The integrated magnetic apparatus may further include: a housing part provided beneath a bottom surface and including a coolant disposed therebeneath; and a cooling bar surrounded by the at least one pillar in a state in which the cooling bar is spaced apart from the at least one pillar by predetermined intervals, provided on a central portion of the housing part, passing through a central portion of the bottom surface, and provided in parallel with the at least one pillar.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

Present Invention

Figure 1:
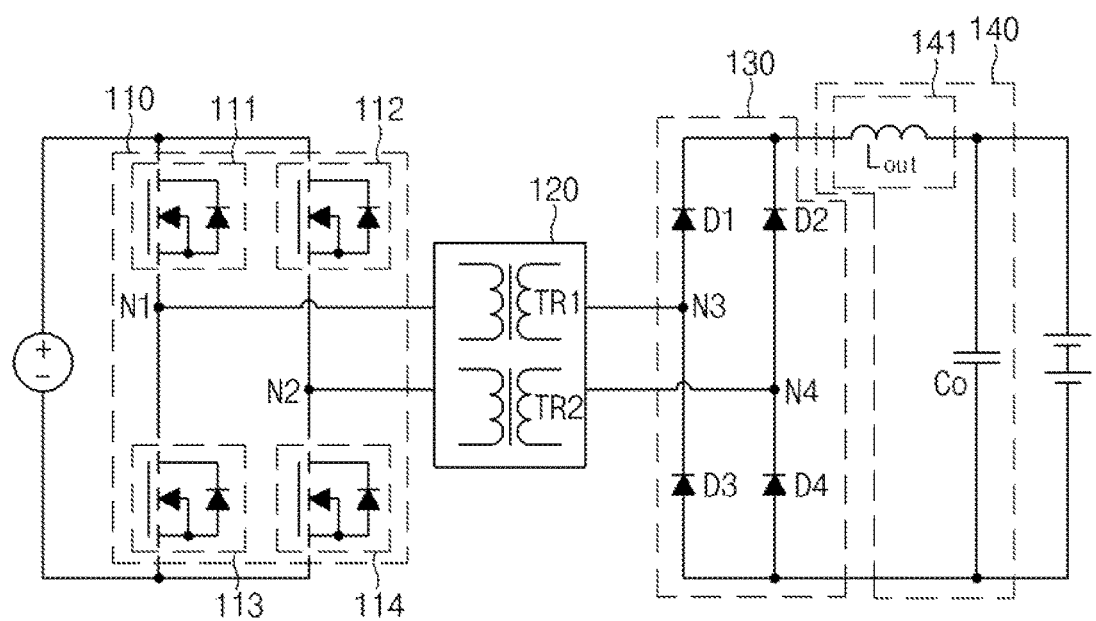
FIG. 1 is a circuit diagram of a single direct current (DC)-DC converter in which an integrated magnetic apparatus according to various exemplary embodiments of the present invention is used.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. It is to be noted that in giving reference numerals to components of the accompanying drawings, the same components will be denoted by the same reference numerals even though they are illustrated in different drawings. Further, in describing exemplary embodiments of the present invention, well-known constructions or functions will not be described in detail in the case in which it is decided that they may unnecessarily obscure the understanding of exemplary embodiments of the present invention.

Terms 'first', 'second' A, B, (a), (b), and the like, will be used in describing exemplary embodiments of the present invention. These terms are used only to distinguish any component from other components, and features, sequences, or the like, of corresponding components are not limited by these terms. In addition, unless defined otherwise, all the terms used in the present specification, including technical and scientific terms, have the same meanings as meanings that are generally understood by those skilled in the art to which the present invention pertains. It should be interpreted that terms defined by a generally used dictionary are identical with the meanings within the context of the related art, and they should not be ideally or excessively formally interpreted unless the context clearly dictates otherwise.

Hereinafter, exemplary embodiments of the present invention will be described in detail with reference to FIGS. 1 to 12.

FIG. 1 is a circuit diagram of a single direct current (DC)-DC converter in which an integrated magnetic apparatus according to various exemplary embodiments of the present invention is used.

Referring to FIG. 1, the single DC-DC converter according to an exemplary embodiment of the present invention switches, transforms, rectifies, and outputs input DC power.

To this end, the single DC-DC converter according to an exemplary embodiment of the present invention includes a switching part 110, a transforming part 120, a rectifying part 130, and an output part 140.

The switching part 110 switches the input DC power and outputs the switched power to the transforming part 120. The switching part 110 includes a plurality of switching elements 111, 112, 113, and 114. The switching elements 111 and 113 are connected to each other in series, the switching elements 112 and 114 are connected to each other in series, and the switching elements 111 and 113 and the switching elements 112 and 114 are connected to each other in parallel.

The transforming part 120 transforms a voltage switched by the switching part 110. To this end, the transforming part 120 includes a first transistor TR1 and a second transistor TR2. The first transistor TR1 is connected to a node N1 at which the switching elements 111 and 113 meet each other, and the second transistor TR2 is connected to a node N2 at which the switching elements 112 and 114 meet each other.

The rectifying part 130 rectifies an output of the transforming part 120, and includes diodes D1 and D3 connected to each other in series and diodes D2 and D4 connected to each other in series. Here, the diodes D1 and D3 and the diodes D2 and D4 are connected to each other in parallel. A node N3 at which the diodes D1 and D3 meet each other is connected to the first transistor TR1, and a node N4 at which the diodes D2 and D4 meet each other is connected to the second transistor TR2.

The output part 140 includes an inductor Lout and a capacitor Co to filter an output of the rectifying part 130.

A DC-DC converter for a 11 kW-level low speed charger is configured to include a plurality of converters for 3.3 kW-level and 6.6 kW-level low speed chargers. However, as described above, in the present invention, a single DC-DC converter is implemented to solve a conventional problem that microcomputers should be included in and control the plurality of converters, such that only a single microcomputer is included in the single DC-DC converter, thereby making it possible to minimize a cost and a size of the DC-DC converter.

In addition, in the present invention, a single DC-DC transformer is implemented, thereby making it possible to prevent unbalance of a current between transformers depending on primary and secondary connection schemes of the transformers and solve unbalance of a current among a plurality of DC-DC converters.

Figure 2:
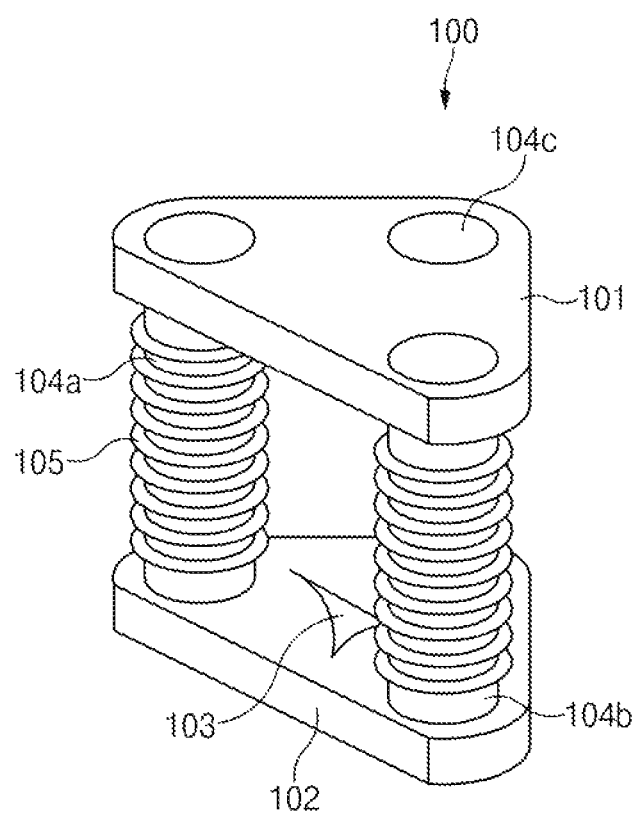
FIG. 2 is a perspective view of the integrated magnetic apparatus according to various exemplary embodiments of the present invention.

FIG. 2 is a perspective view of the integrated magnetic apparatus according to various exemplary embodiments of the present invention.

Referring to FIG. 2, the integrated magnetic apparatus according to various exemplary embodiments of the present invention may have a structure in which the transforming part 120 and an inductor 141 of FIG. 1 are integrated with each other. That is, a plurality of pillars 104 are disposed between a bottom surface 102 and a roof surface 101 to be spaced apart from one another by predetermined intervals. In this case, windings 105 are wound around the plurality of pillars 104, 104b, and 104c, respectively, the number of pillars 104, 104b, and 104c is three, one pillar is driven as the inductor 141, and the other two pillars are driven as the first transistor TR1 and the second transistor TR2. In this case, although an example in which each of the pillars 104a, 104b, and 104c is implemented in a single form has been illustrated in FIG. 2, the pillar 104b may be implemented to be separated into a part adjacent to the roof surface 101 and a part adjacent to the bottom surface 102 to allow a gap 106 to be formed in a middle of the pillar 104b, to adjust an inductance.

Figure 3:
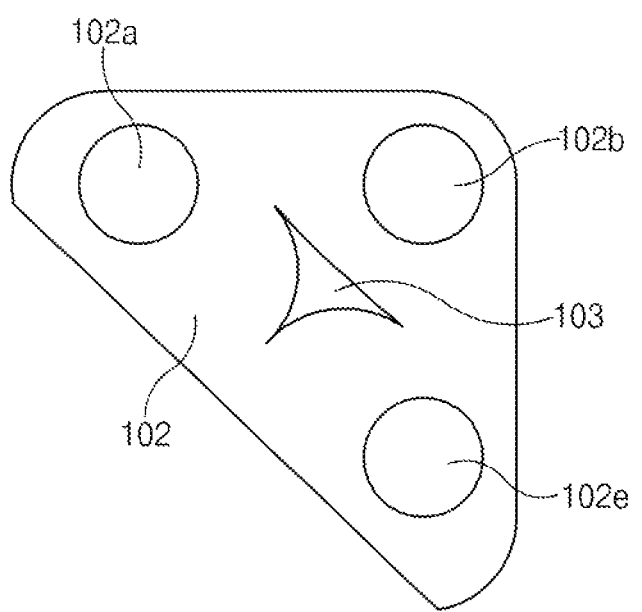
FIG. 3 is a detailed view of a bottom surface of the integrated magnetic apparatus of FIG. 2.

FIG. 3 is a detailed view of a bottom surface 102 of the integrated magnetic apparatus of FIG. 2.

Holes 102a, 102b, and 102c to which the plurality of pillars 104a, 104b, and 104c are connected are provided at the respective corners of the bottom surface 102 of the integrated magnetic apparatus, and a hole 103 is provided at a position spaced apart from the respective holes 102a, 102b, and 102c at a central portion of the bottom surface 102. This hole 103 is a hole for providing a cooling bar of an integrated magnetic apparatus according to various exemplary embodiments of the present invention later.

Figure 4:
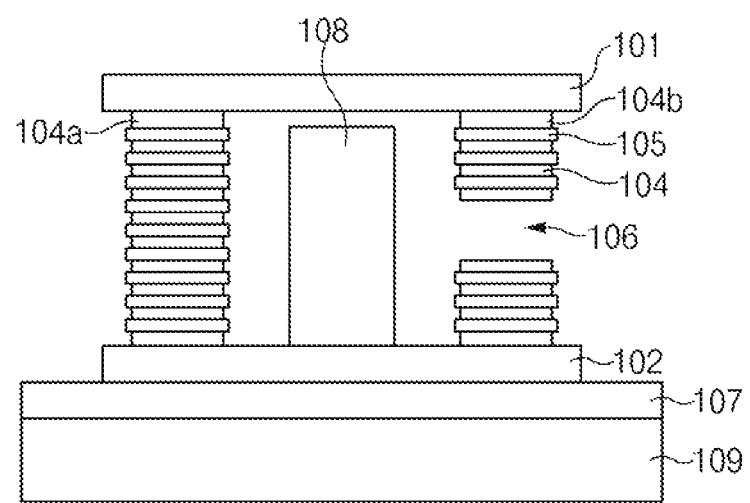
FIG. 4 is a cross-sectional view of an integrated magnetic apparatus according to various exemplary embodiments of the present invention.

FIG. 4 is a cross-sectional view of an integrated magnetic apparatus according to various exemplary embodiments of the present invention.

In the integrated magnetic apparatus according to various exemplary embodiments of the present invention, a housing part 107 is provided beneath a bottom surface 102, a cooling bar 108 connected to the housing part 107 and passing through the hole 103 of the bottom surface 102 to thereby be disposed on the central portion of the bottom surface 102 is provided, and a coolant 109 is provided on a lower surface of the housing 107.

The cooling bar 108 radiates heat generated in a magnetic structure to decrease a temperature of the magnetic structure, and a separate cooling component is not required through the structure described above, such that a size of the magnetic structure may be decreased.

In this case, although an example in which the pillar 104b is implemented to be separated into a part adjacent to the roof surface 101 and a part adjacent to the bottom surface 102 to allow a gap to be formed in a middle of the pillar 104b has been illustrated in FIG. 4, the pillar 104b is not limited thereto, but may also be implemented to be a single type pillar in which the gap is not formed.

Figure 5:
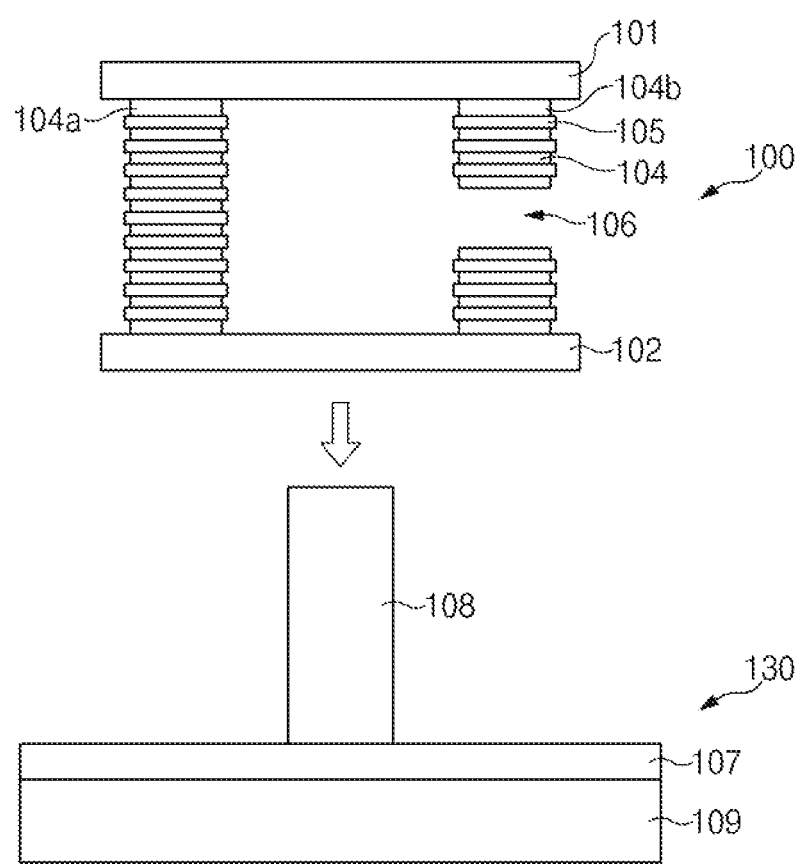
FIG. 5 is a view for describing a process of manufacturing the integrated magnetic apparatus according to various exemplary embodiments of the present invention.

FIG. 5 is a view for describing a process of manufacturing the integrated magnetic apparatus according to various exemplary embodiments of the present invention.

As illustrated in FIG. 5, an integrated magnetic structure 100 of FIG. 2 is combined with the cooling bar 108 connected to the housing part 107. The cooling bar 108 passes through the hole 103 of the bottom surface 102 of the integrated magnetic structure 100 to thereby be combined with the housing part 107.

As described above, in the integrated magnetic apparatus using the cooling bar, the transformers and the inductor are integrated with each other in one structure, such that a size of the DC-DC converter may be decreased. Therefore, the number of components required at the time of performing cooling may be decreased, thereby making it possible to decrease an entire volume, a cost, and a weight of the DC-DC converter.

Figure 6:
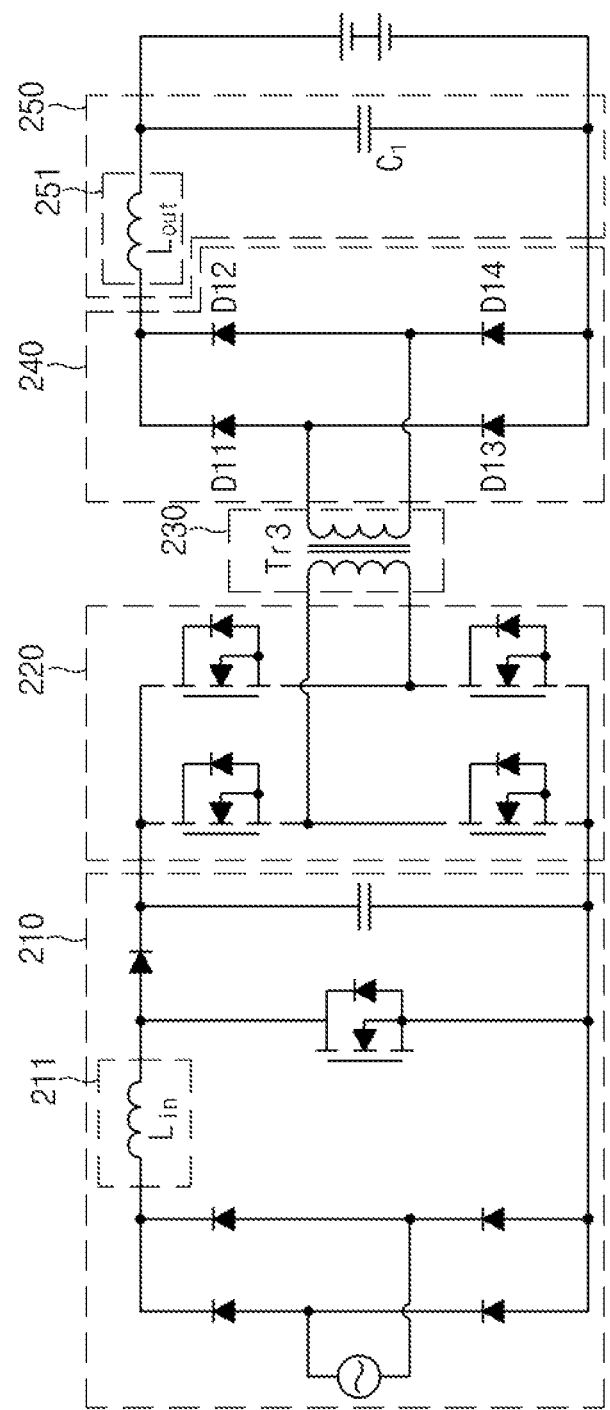
FIG. 6 is a circuit diagram of a DC-DC converter in which an integrated magnetic apparatus according to various exemplary embodiments of the present invention is used.

FIG. 6 is a circuit diagram of a DC-DC converter in which an integrated magnetic apparatus according to various exemplary embodiments of the present invention is used.

Referring to FIG. 6, the DC-DC converter according to an exemplary embodiment of the present invention includes an input part 210, a switching part 220, a transforming part 230, a rectifying part 240, and an output part 250.

The input part 210 receives input DC power applied thereto, and provides the input DC power to the switching part 220. The input part 210 includes a plurality of diodes and an inductor 211.

The switching part 220 switches the input DC power, outputs the switched power to the transforming part 230, and includes a plurality of switching elements.

The transforming part 230 transforms a voltage switched by the switching part 220. In this case, the transforming part 230 includes one transistor TR3 corresponding to one switching part 220.

The rectifying part 240 rectifies an output of the transforming part 230, and includes diodes D11 and D13 connected to each other in series and diodes D12 and D14 connected to each other in series.

The output part 250 includes an inductor 251 and a capacitor C1 to filter an output of the rectifying part 240.

Figure 7:
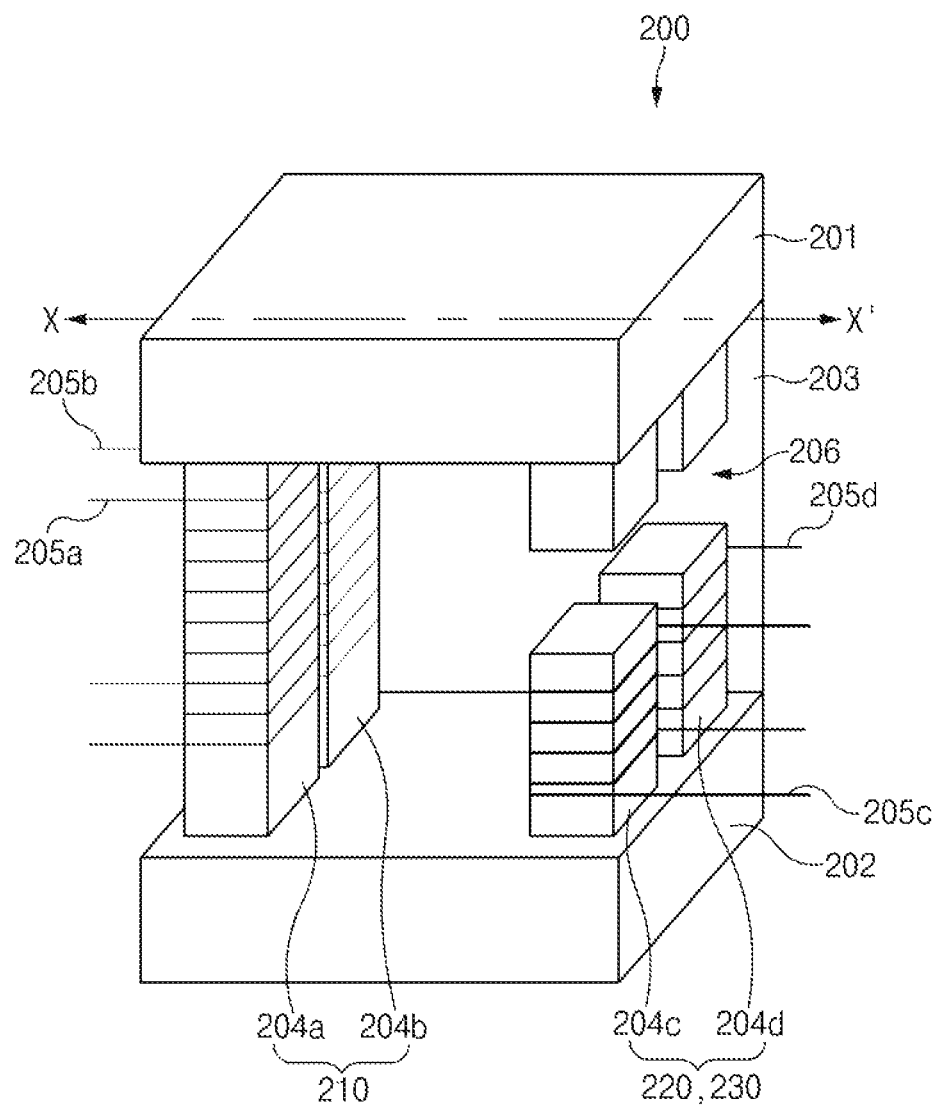
FIG. 7 is a perspective view of the integrated magnetic apparatus according to various exemplary embodiments of the present invention.

FIG. 7 is a perspective view of the integrated magnetic apparatus according to various exemplary embodiments of the present invention.

Referring to FIG. 7, in the integrated magnetic apparatus according to various exemplary embodiments of the present invention, the single transistor TR3 of the transforming part 230, the inductor 211 of the input part 210, and the inductor 251 of the output part 250 of FIG. 6 are combined with one another to thereby be configured in one integrated structure.

In the integrated magnetic apparatus according to various exemplary embodiments of the present invention, a roof surface 201 and a bottom surface 202 face each other, one wall surface part 203 connecting the roof surface 201 and the bottom surface 202 to each other is provided, and a plurality of pillars 204a, 204b, 204c, and 204d are disposed between the roof surface 201 and the bottom surface 202 to be spaced apart from each other by predetermined intervals.

In addition, windings 205a, 205b, 205c, and 205d are wound around the pillars 204a, 204b, 204c, and 204d, respectively, the pillars 204a and 204b are driven as one transforming part 230, and the pillars 204c and 204d are driven as the inductors 211 and 251, respectively. In this case, the pillars 204c and 204d driven as the inductors 211 and 251, respectively, may be formed of ferrite. In this case, although the pillars 204 and 204d are implemented in a separated structure, they may also be implemented in a form in which they are not separated depending on an inductance. That is, since the inductors are formed of the ferrite to be easily saturated, gaps are formed in the inductors so that the inductors have a separated structure, thereby making it possible to avoid a saturation phenomenon.

In this case, a saturation magnetic flux density of the inductor is determined by the following Equation 1, and a saturation magnetic flux density of the transformer is determined by the following Equation 2.

$$B_{max} = \frac{0.4\pi \times NL \times F \times \Delta I_L \times 10^{-4}}{l_g + \frac{MPL}{\mu}} \quad \text{[Equation 1]}$$

Here, $B_{max}$ means a saturation magnetic flux density, NL means the number of windings of the inductor, $\Delta I_L$ means a current ripple of the inductor, $\mu$ means a relative permeability, MPL means a length of a circumference of an inductor core, F means a factor by which a flux is impeded by the gap, and $l_g$ means a size (mm) of the gap.

$$B_{max} = \frac{V_{in} \times 10^4}{K_f \times N_{pri} \times fs \times Ac} \quad \text{[Equation 2]}$$

Here, $B_{max}$ means a saturation magnetic flux density, $V_{in}$ means a voltage applied to the transformer, kf means a core constant, $N_{pri}$ means the number of primary windings of the transformer, fs means a switching frequency, and Ac means a cross-sectional area of a core.

Figure 8:
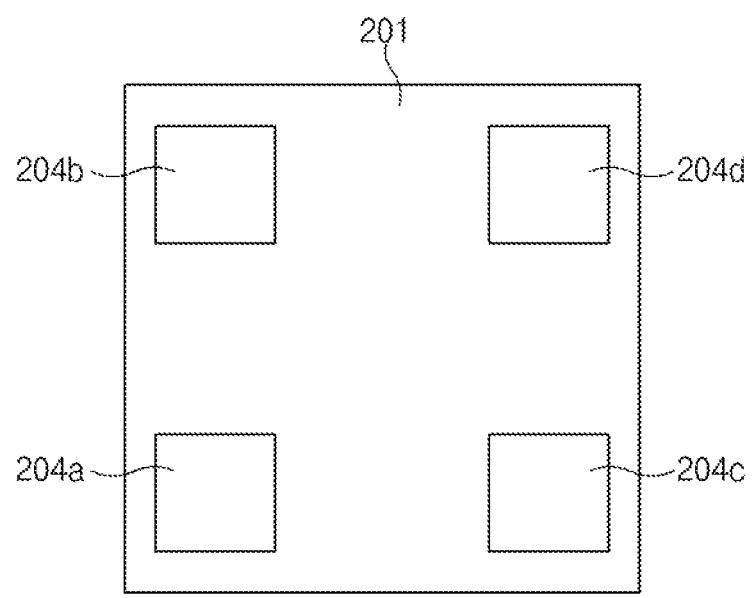
FIG. 8 is a top view of the integrated magnetic apparatus according to various exemplary embodiments of the present invention.

FIG. 8 is a top view of the integrated magnetic apparatus according to various exemplary embodiments of the present invention.

Referring to FIG. 8, the roof surface 201 of the integrated magnetic apparatus according to various exemplary embodiments of the present invention may have a quadrangular structure, and the pillars 204a, 204b, 204c, and 204d are connected, respectively, to corners of the roof surface 201.

Figure 9:
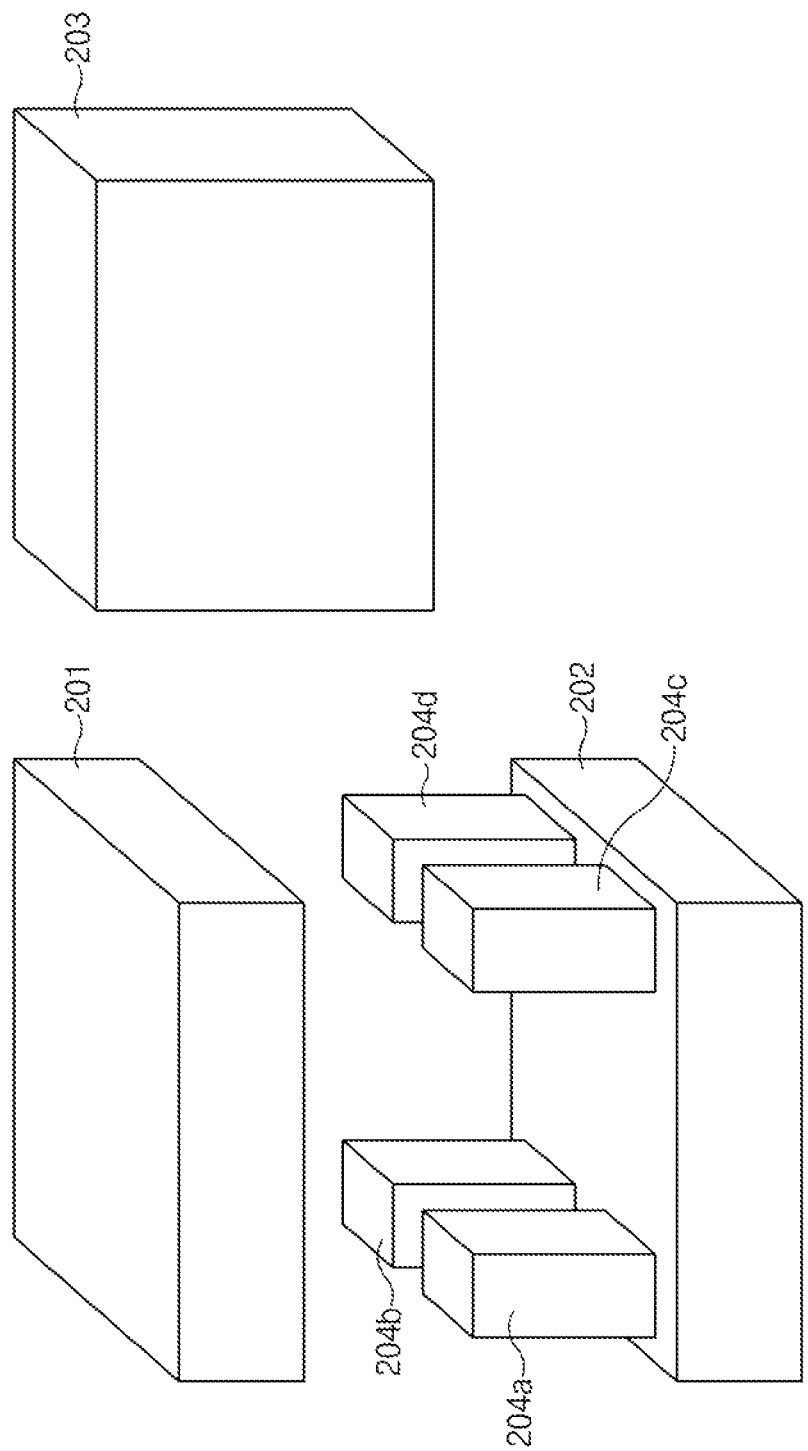
FIG. 9 is an exploded perspective view of the integrated magnetic apparatus according to various exemplary embodiments of the present invention.
Figure 10:
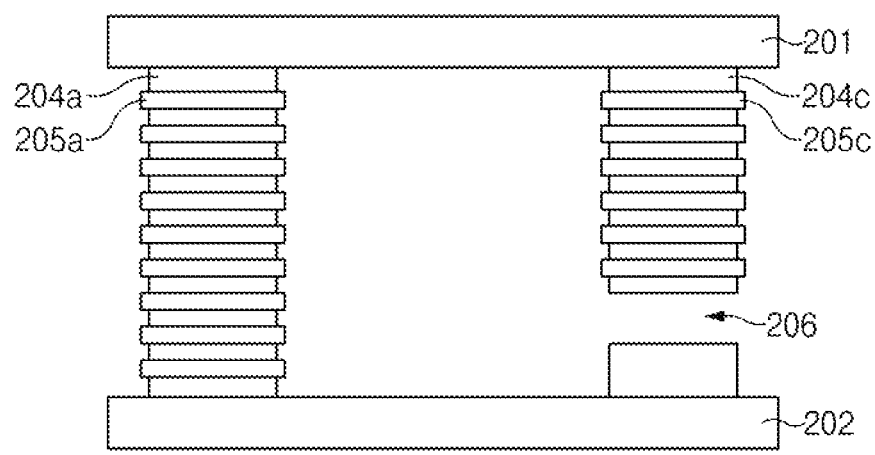
FIG. 10 is a cross-sectional view of the integrated magnetic apparatus according to various exemplary embodiments of the present invention.

FIG. 9 is an exploded perspective view of the integrated magnetic apparatus according to various exemplary embodiments of the present invention, and FIG. 10, which is a cross-sectional view of the integrated magnetic apparatus according to various exemplary embodiments of the present invention, is a cross-sectional view taken along line X-X' of FIG. 7.

As described above, different energies (currents) are summed up in one magnetic structure (core), and the wall surface part is provided to facilitate an energy flux, such that a kind of route is formed through the wall surface part.

Figure 11:
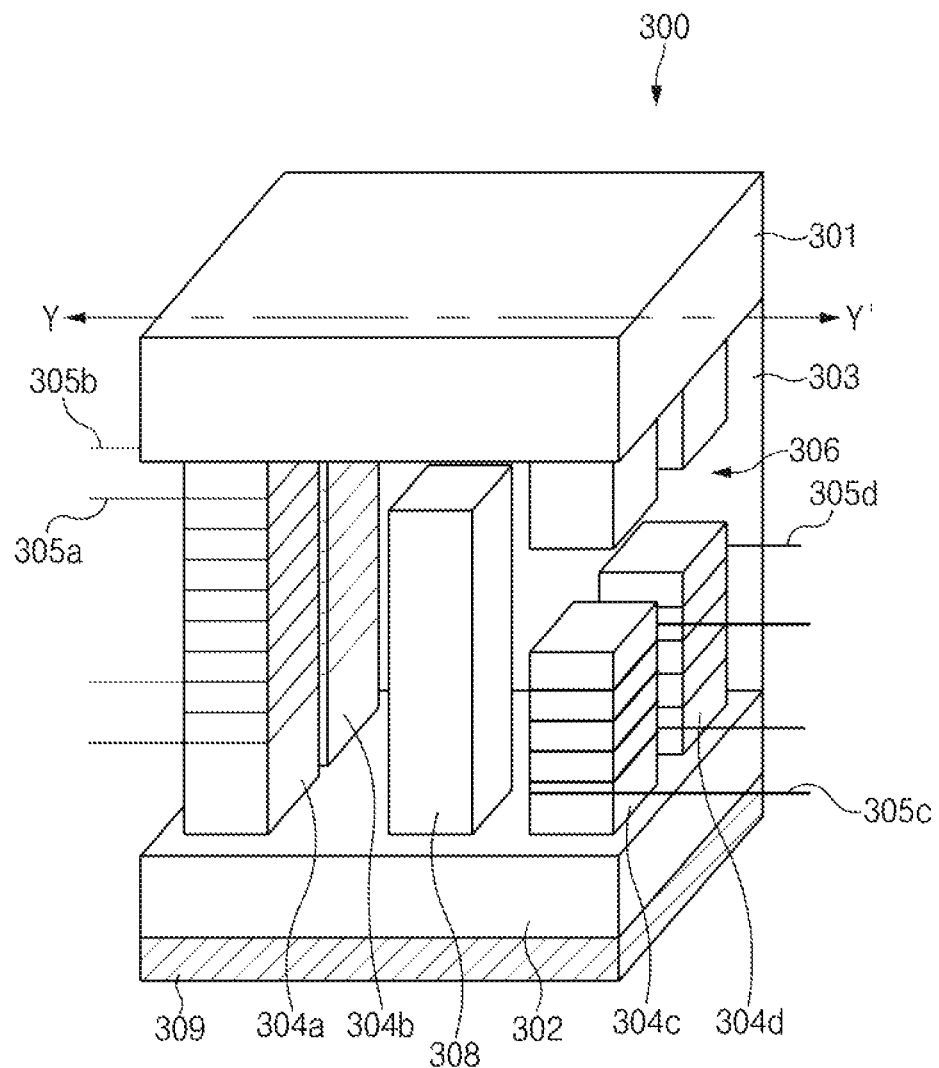
FIG. 11 is a perspective view of an integrated magnetic apparatus according to various exemplary embodiments of the present invention.

FIG. 11 is a perspective view of an integrated magnetic apparatus according to various exemplary embodiments of the present invention.

Referring to FIG. 11, in the integrated magnetic apparatus according to various exemplary embodiments of the present invention, a cooling bar 308 is provided at a position spaced apart from a plurality of pillars 305a, 305b, 305c, and 305d by predetermined intervals at a central portion of a bottom surface 302 of the integrated magnetic apparatus of FIG. 7. A housing part 307 is provided beneath a bottom surface 302, and a coolant 309 flows beneath the housing part 307.

Figure 12:
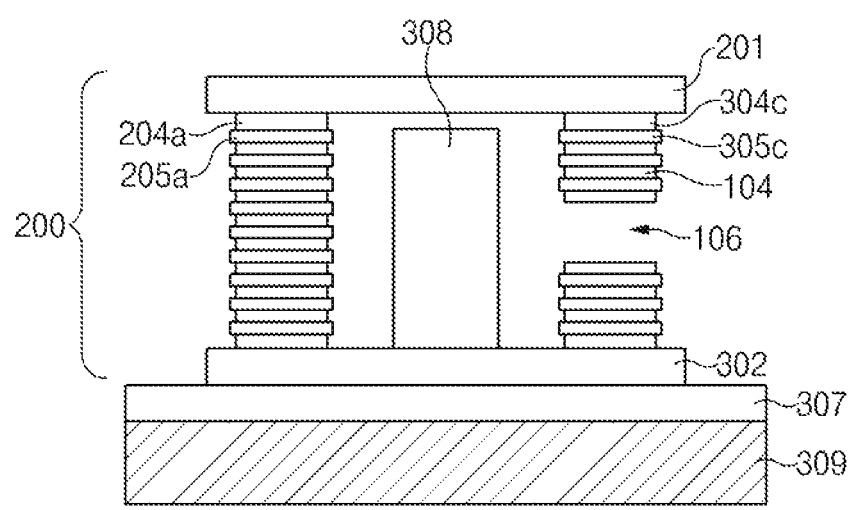
FIG. 12 is a cross-sectional view of the integrated magnetic apparatus according to various exemplary embodiments of the present invention.

FIG. 12, which is a cross-sectional view of the integrated magnetic apparatus according to various exemplary embodiments of the present invention, illustrates a cross section taken aling line Y-Y' of FIG. 11.

Conventionally, in the case in which the inductor and the transforming part are used as individual components, mold structures for heat radiation were used in the individual components, respectively, such that an entire volume and a cost were increased due to structures for assembling, such as molds, cases, bolting parts, and the like. To solve the conventional problem as described above, in the present invention, the inductor and the transforming part are integrated with each other to thereby be implemented in one magnetic structure. Therefore, an unnecessary mold structure, or the like, for the individual components is removed, thereby making it possible to minimize the entire volume increase and the cost increase, and the cooling bar is provided without increasing a size, thereby making it possible to increase a heat radiation effect.

As described above, in the present invention, an integrated design of the inductor and the transforming part applied to AE EV and JF/AE PHEV on-board chargers (OBCs) is disclosed. The transformer and the inductor are integrated with each other in one core, thereby making it possible to further optimize a design, and the numbers of the molds, the cases, the bolting parts, and the like, used in the individual components are decreased, thereby making it possible to expect a decrease in an entire size, a weight, and a cost in terms of a structure.

As described above, the present technology may minimize a cost and a size of the DC-DC converter using a single microcomputer.

In addition, the present technology provides the integrated magnetic apparatus in which the transformer and the inductor are combined with each other, thereby making it possible to minimize a cost and a size of the DC-DC converter.

Further, the present technology may minimize a heat generation problem of the integrated magnetic apparatus by including the cooling bar.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An integrated magnetic apparatus comprising:
   a bottom plate having a predetermined size;
   at least one pillar disposed on the bottom plate to be spaced apart from each other by predetermined intervals and having coils wound therearound, respectively, to thereby be driven as at least one transforming part and at least one inductor;
   a roof plate provided on the at least one pillar and facing the bottom plate in parallel with the bottom plate;
   a housing part provided beneath the bottom plate and including a coolant disposed beneath the housing part; and
   a cooling bar surrounded by the at least one pillar in a state in which the cooling bar is spaced apart from the at least one pillar by predetermined intervals, provided on a central portion of the housing part, passing through a central portion of the bottom plate, and provided in parallel with the at least one pillar.

2. The integrated magnetic apparatus according to claim 1, wherein the at least one pillar include:
   a first pillar driven as a first transforming part of the at least one transforming part;
   a second pillar driven as a second transforming part of the at least one transforming part; and
   a third pillar driven as one of the at least one inductor.

3. The integrated magnetic apparatus according to claim 2, wherein the third pillar is separated into a part adjacent to the bottom plate and a part adjacent to the roof plate to thereby include a gap disposed between the part adjacent to the bottom plate and the part adjacent to the roof plate.

4. The integrated magnetic apparatus according to claim 1 wherein the at least one pillar include:
   first and second pillars driven as one of the at least one transforming part;
   a third pillar driven as a first inductor of the at least one inductor; and
   a fourth pillar driven as a second inductor of the at least one inductor.

* * * * *